United States Patent
Nobuyasu et al.

(10) Patent No.: US 6,596,331 B1
(45) Date of Patent: Jul. 22, 2003

(54) METHODS OF PRODUCING LONG-LIFE FRESH PASTA PRODUCTS

(75) Inventors: Yoshio Nobuyasu, Kusatsu (JP); Michiyuki Tabuchi, Kyoto (JP); Yoshifumi Morita, Fujieda (JP); Shohei Matsuyama, Kusatsu (JP); Nobuyuki Akamatsu, Kusatsu (JP)

(73) Assignee: Nissin Shokuhin Kabushiki Kaisha, Osaka (JP)

( * ) Notice: Subject to any disclaimer, the term of this patent is extended or adjusted under 35 U.S.C. 154(b) by 0 days.

(21) Appl. No.: 09/647,392

(22) PCT Filed: Apr. 5, 1999

(86) PCT No.: PCT/JP99/01770

§ 371 (c)(1),
(2), (4) Date: Nov. 30, 2000

(87) PCT Pub. No.: WO99/51110

PCT Pub. Date: Oct. 14, 1999

(30) Foreign Application Priority Data

Apr. 6, 1998 (JP) .............................................. 10-093459

(51) Int. Cl.$^7$ .............................................. A23L 1/162
(52) U.S. Cl. ........................ 426/557; 426/325; 426/451
(58) Field of Search ................................ 426/557, 451, 426/325

(56) References Cited

U.S. PATENT DOCUMENTS

| 4,000,330 A | | 12/1976 | Sipos et al. | .................. 426/557 |
| 4,552,772 A | * | 11/1985 | Saitoh | ........................ 426/557 |
| 4,828,852 A | * | 5/1989 | Hsu et al. | .................... 426/557 |
| 5,124,168 A | * | 6/1992 | McMillin et al. | ........... 426/451 |
| 5,332,587 A | * | 7/1994 | Howard et al. | ............. 426/557 |
| 5,562,938 A | * | 10/1996 | Lee et al. | .................... 426/557 |
| 5,599,573 A | * | 2/1997 | Barnes et al. | ................ 426/557 |
| 5,695,801 A | * | 12/1997 | Oh | .............................. 426/325 |

FOREIGN PATENT DOCUMENTS

JP          05 328927 A      12/1993

* cited by examiner

*Primary Examiner*—Lien Tran
(74) *Attorney, Agent, or Firm*—Marshall, Gerstein & Borun

(57) ABSTRACT

A method for producing fresh pasta products having reduced sourness comprising the steps of:

(i) preparing dough by mixing raw materials with water,
(ii) preparing pasta threads by extruding the dough;
(iii) gelatinizing the pasta threads by sting and/or boiling the pasta
(iv) acidifying the gelatinized pasta threads with acid(s) solution; and
(v) packing hermetically the acidified pasta threads into food containers and pasteurizing there;

wherein the raw flour in the raw materials are those selected to have an ash content of 0.45 wt % or less.

9 Claims, No Drawings

METHODS OF PRODUCING LONG-LIFE FRESH PASTA PRODUCTS

TECHNICAL FIELD

The present invention relates to novel pasta products, in particular, long-life fresh pasta products and methods of producing the same comprising extrusion of dough (pasta dough) and acid(s)-treatment of pasta threads.

BACKGROUND ART

"Long-Life Fresh Noodles" have shelflife as long as several months at room temperature regardless of their high water content, and they have popularly been marketed in recent years. They are called in Japan as "Long-Life Noodles (LL Noodles)" or "Fresh-Type Instant Noodles". These long-life fresh noodles are usually produced by gelatinizing noodle threads, acidifying the gelatinized threads (boilied and/or steamed threads), hermetically packing the acidified threads, and pasteurizing them at about 100° C. or below (But, in some cases, such pasteurization were performed at about 100° C. or above). Long-life fresh noodles so produced can be served in a short time in comparison with (common) dried noodles, and can be served simply by pouring hot water thereinto though it depends on the type of noodles. Qualities of the long-life fresh noodles would be better than that of the noodle products produced by "retort" process and damaged drastically thereby.

But manufacturing process of the long-life fresh noodles needs a step to acidify noodle threads with acid(s) to obtain the longer shelflife, therefore, sourness (tartness) was often felt in the noodles. Some methods have been offered to eliminate such unacceptable taste, for example, by adding particular masking agents to the acid(s) or by adding alkaline agents into the soup.

Fairly strong sourness was often felt in the long-life fresh pasta products (e.g., macaroni, spaghetti) when they were produced along with the aforenoted producing method for the long-life fresh noodles using durum semolina (semolina of durum wheat) which is raw flour for conventional dried pasta products. Unfortunately, it was quite difficult to eliminate such undesirable sourness effectively.

DISCLOSURE OF INVENTION

The present inventors worked to solve such problems in the long-life fresh pasta products. They aimed at flours employed in the pasta products and speculated that the composition of wheat flour, and in particular, that of durum flour, may be the cause of such unacceptable taste. Then, they examined the correlation between the main components of durum flour and sourness. As a result, little correlation between protein content and sourness was confirmed. On the other hand, however, a close correlation between ash content and sourness was found.

In general, since the strength of sourness will be influenced by not only pH value but also acid concentration, even if the pH is the same, lowering acid concentration will be effective to weaken sourness. The present inventors found that ash in the flour suppressively acts to lower the pH of pasta. Further, they found that pasta threads can be effectively acidified with relatively small amount of acid, when flour of the lower ash content is employed. Thereby, problems on sourness in the conventional long-life fresh pasta products can be solved.

The present invention is directed to long-life fresh pasta products produced from flours having ash content of 0.45 wt % or less, preferably, 0.40 wt % or less. Then, the present invention is also directed to producing method of long-life fresh pasta products comprising the steps of: (1) preparing dough by mixing with water the raw flour having ash content of 0.45 wt % or less, preferably, 0.40 wt % or less (other materials such as starches, salts, alkaline agents, gelling agents, fats, oils, additives or the like may be added to the raw flour), (2) preparing pasta threads by extruding the dough, (3) gelatinizing the pasta by steaming and/or boiling the threads, (4) acidifying the gelatinized pasta with acids during or after the gelatinization, and (5) hermetically packing the acidified pasta into food-container and pasteurizing them.

Preferably, from about 1 to about 20 g of one or more of alginate-material(s) is(are) added to 1 kg of the raw flour. Such alginate-material(s) may include(s) alginic acids, salts of alginic acids and esters of alginic acids. Dough pH is adjusted from about 7 to about 9.

Further, preferably, from about 1 to about 20 g of one or more fat(s) and/or oil(s) is(are) added to the raw flour. They may include butter, butter oil, margarine and shortening.

BEST MODE FOR CARRYING OUT THE INVENTION

The detailed description on the present invention are set forth as follows.

The term "long-life fresh pasta products" used herein directs to any pasta produced through the producing methods of the long-life fresh noodles wherein the methods comprise extrusion of the pasta dough from an extruder and acid(s)-treatment of the pasta threads. The present long-life fresh pasta products may include any extruded products such as macaroni, spaghetti, shell or lasagna.

Ash content in the raw flour of the present invention (based on weight of wheat flour) is 0.45 wt % or less, preferably 0.40 wt % or less, and most preferably 0.38 wt % or less. Although wheat flour contains at least about 0.30 wt % of ash, any wheat flour having lower ash content can also be applied to the present invention. Wheat flours commercially distributed in Japan are classified into first-grade wheat flour, semi-first-grade wheat flour or the like according to their protein content. In general, since the first-grade wheat flour is made mainly from core portion of the wheat seed and has less ash content, it is most suitable to the present invention. Besides the first-grade wheat flour, semi-first-grade wheat flour (usual ash content of which is from about 0.40 to about 0.45 wt %) is also applicable to the present invention.

A mixture of two or more kinds of wheat flours of different ash content may also be employed. However, when such mixture is employed, it is also necessary to adjust its ash content to 0.45 wt % or less, preferably 0.40 wt % or less.

On the other hand, it is not preferable to employ semolina because the semolina (roughly ground durum wheat) commonly used for pasta products contains about as much as 0.7 wt % of ash. But, if the ash content is reduced to 0.45 wt % or less by selecting milling methods or the like, such processed semolina can also be employed in the present invention. When the normal durum semolina is used as a component of the raw flour, the amount of durum semolina to raw flour should be adjusted as low as 20 wt % or less, preferably 10 wt % or less.

Wheat flours are often classified based on the protein content as noted previously. But any wheat flour having ash content of 0.45 wt % or less can be employed in the present invention. Then, according to the present invention, wheat flours having protein content of from about 11 wt % to about 12 wt % are recommended to get the natural taste and texture of the dried pasta products.

As stated previously, a step to acidify the pasta threads is essential step for producing the long-life fresh pasta products of the present invention. But, such step often result in losing the firm texture felt by cooking dried pasta products even if the pasta is made from high-protein wheat flours. Further, gelling agents, proteins, enzymes or the like can be employed in the present invention to keep the firm texture. Gelling agents may include alginate-materials, xanthan gum, pectin, curdlan or the like. Proteins may include egg white, gluten or the like. Enzymes may include transglutaminase or the like. Among these materials or additives, alginate-materials are preferably added to get the desired pasta texture. The amount of the alginate-materials is from about 1 g to about 20 g per 1 kg of wheat flour, preferably, from about 3 g to about 6 g per 1 kg of wheat flour. Alginate-materials may include alginic acids, salts of alginic acids (e.g., sodium alginates, potassium alginates), esters of alginic acids (e.g., alginic acid propyleneglycol ester).

It is preferable to further incorporate alkaline agents into the raw flour when the alginate-materials are added to keep firm texture of the pasta products. Such alkaline agents may include sodium carbonate, potassium carbonate, kansui or the like. Amount of the alkaline agents is the amount needed to adjust dough pH into neutral to alkaline zone, preferably from about pH 7 to 9 when water is added thereto.

In accordance with the other embodiment of the present invention, fat(s) and/or oil(s) is(are) preferably incorporated into the raw flour to improve flavor and texture of the present long-life fresh pasta products. They may include butter, butter oil, margarine and shortening. By employing it(them), taste and mouth-feel of the common dried pasta are realized, and sourness and sour-odor remained in the acidified pasta are effectively removed (See, Example 4). The amount of it(them) is from about 1 g to about 20 g per 1 kg of raw flours, preferably, from about 2 g to about log per 1 kg of raw flours. Other raw materials or additives can optionally be added to the raw flours. They may include starches, proteins, salts, colours, gelling agents, fats and the like. With respect to the starches, modified starches are recommended to avoid unacceptable deterioration of flavor and texture. Such modified starches may include starch-esters, starch-ethers and crosslinked starches.

Dough is prepared by mixing raw flours and, if necessary, raw materials or additives mentioned above, and kneading the mixture with water. The dough so prepared are then extruded. The raw materials or additives such as alginate-materials can be added in a powder form to raw flour. They can also be dissolved into water and be added to the flour. Warm water can also be employed. Pasta of the present invention is made by adding water to a mixture of raw flour and raw materials, preparing dough by kneading them with a mixer, extruding the dough so prepared with an extruder. As an extruder, screw extruder is preferable to realize the desirable firm pasta. When the dough is extruded with an extruder, it is deaerated under reduced pressure in order to realize desirable dense-tissued pasta. The pasta dough are preferably kneaded and/or extruded under the reduced pressure of 200 mmHg (absolute pressure) or less. Extruding pressure is 40 kg/cm$^2$ or more, preferably 80~130 kg/cm$^2$.

Openings on an extrusion head are shaped according to the form of pasta to be produced. For example, when long-pasta like spaghetti is going to produce, cross-sectional form of discharge-openings on the extrusion head is shaped into circular or the like. Pasta can also be prepared by applying dough to an extruder, extruding them from an elongated openings on the extrusion head and processing the extruded sheet into the pasta threads. When short-pasta like macaroni, shell or farfallina are going to made, any of the following methods is used, namely, (i) to cut the extruded dough from the openings on the extrusion head, (ii) to form the short-pasta by extruding the dough into shaped molds, or (iii) to form the short-pasta by punching the dough sheet prepared through extrusion of dough from elongated openings on the extrusion head.

The term "pasta threads" used herein directed to any thread and short pasta prepared through such extrusion procedure.

Although pasta threads so extruded can be once dried like common dried pasta products, the present invention does not always need such drying step. Extruded threads and/or dried threads are gelatinized by steaming or boiling them (i.e., the threads are partially or completely cooked at this step). Such steaming and boiling can be performed sequentially or concurrently.

The gelatinized pasta threads are then acidified to adjust pH of pasta threads to pH below 4.6, preferably from about 4.0 to about 4.5. Acidification of the pasta threads may be performed by dipping the pasta threads into an acid solution or by spraying an acid solution to the pasta threads. Acid solution may includes an aqueous solution of organic acids including lactic acid, citric acid, acetic acid or the mixture thereof. When the pasta threads are gelatinized by boiling, gelatinization and acidification of the pasta threads can be performed concurrently by putting the pasta threads into the boiled acid(s) solution.

Acidified pasta threads are hermetically packed into food-container and are pasteurized. The term "food-container" used herein may includes both hard and soft container(s), for example, vessels made of ceramic or metal, bags or pouches made of plastic resin. Acidified pasta threads are then preferably pasteurized at a temperature of from about 90° C. to about 100° C. Pasteurization of the pasta threads is usually conducted under 100° C. or below in the art, but the present pasta threads can also be pasteurized under 100° C. or above. For example, the pasta threads are pasteurized at 95° C. for 20 minutes or more in a steam chamber. The pasteurized pasta threads are then cooled, and are called at this point as "long-life fresh pasta products" of the present invention. The present long-life fresh pasta products are further packed into cup-form hard vessels or plastic bags, and are distributed under the room temperature.

The long-life fresh pasta products according to the present invention can be served, for example, by cooking the pasta threads taken out from the pouch by (i) simply pouring hot-water onto the pasta, (ii) pouring hot-water onto the pasta and discarding the hot-water, (iii) simply boiling the pasta, or (iv) boiling the pasta with hot-water and discarding the hot-water. When the pasta is going to be cooked through the procedure (iii) or (iv), lower water content in the pasta threads is recommended to get the desirable pasta texture.

EXAMPLES

The following Examples of the present invention are for the sake of clearness of understanding only, and no unnecessary limitation should be understood therefrom, as modifications will be obvious to those skilled in the art.

Example 1

With regard to ash content in the wheat flour (medium protein content flour; approximately 11 wt % protein content), correlation between ash content and taste on pasta was examined by determining the amount of lactic acid necessary to adjust pH of wheat flour suspension to 4.0.

100 g of wheat flours (Flources 1–4) containing the different ash content were dispersed respectively in 400 ml of distilled water. Then, the amount of lactic acid needed to adjust the pH of the dispersion to 4.0 were determined. Sourness of the dispersion adjusted to pH 4.0 was also organoleptically examined. Results are shown in Table 1. Table 1 indicates that the lower the ash content in the flour, the less the necessary amount of lactic acid. In particular, when ash content is 0.5 wt % or more, strong sourness was felt.

TABLE 1

| Flour | Ash (wt %) | Protein (wt %) | Moisture (wt %) | 50% Lactic Acid (g/100 g Flour) | Sourness |
|---|---|---|---|---|---|
| 1 | 0.52 | 10.9 | 14.5 | 0.60 | Strong |
| 2 | 0.45 | 10.8 | 14.4 | 0.54 | Sensable |
| 3 | 0.40 | 11.0 | 14.4 | 0.49 | Sensable |
| 4 | 0.34 | 11.1 | 14.5 | 0.39 | Weak |

Since this experiment is performed on the wheat flour suspension, sourness has been confirmed on the wheat flours having ash content of 0.45 wt % or less (Flours 2–4). But sourness remained in the long-life fresh pasta will be weaken at meals because it will be hard to sense sourness in the pasta threads (solid phase) than in the suspension (liquid phase).

Example 2

Pasta dough was prepared by mixing and kneading 1 kg of flours listed in the Table 2 and 320 ml of water containing 1 g of polyphosphate and 1.5 g of sodium carbonate. Then, the pasta threads were produced by extruding the pasta dough with an extruder (Automatic Short Pasta Press PA-1 (PAVAN)) equipped with openings (opening diameter: 2.0 mm).

Pasta threads so produced were weighed (about 125 g) and were boiled for 15 seconds. After cooling the boiled threads, the threads pH was adjusted to about 4.3 by immersing the threads for 40 seconds in the lactic acid solution of different concentration. Table 2 shows the concentration of lactic acid used to adjust threads pH to about 4.3 (4.3±0.05). Acidified threads were hermetically packed into plastic pouches together with 2 ml of an edible oil, then were pasteurized with steam pasteurizer (Almighty Steam-Pasteurizer (SANKO)) at 95° C. for 40 mitutes and were cooled. The pasta threads taken out from the pouches were served by leaving them in hot water for one minute and discarding the hot water. Skilled inspectors (five persons) examined the sourness in the served pasta (final water content: 51~52%).

TABLE 2

| Raw Flours | Ash (wt %) | Protein (wt %) | Lactic Acid (w/v %) | Sourness |
|---|---|---|---|---|
| durum semolina | 0.75 | 12.0 | 2.0 | Strong |
| wheat flour | 0.50 | 11.4 | 1.8 | Sensable |
| wheat flour | 0.45 | 12.5 | 1.7 | Slightly Sensable |
| wheat flour | 0.42 | 12.2 | 1.6 | Slightly Sensable |
| wheat flour | 0.39 | 11.1 | 1.5 | Little |

Apparently from the results shown in Table 2 above, wheat flour of high ash content needed much lactic acid to adjust pH of the pasta threads to about 4.3 and sourness thereby was strong. But when ash content was about 0.45 wt % or less, sourness was slightly sensable. Further, when ash content was about 0.40 wt % or less, little sourness had been felt.

Sourness on the long-life fresh pasta products were also examined in this Example without using any seasoning materials. But since sauce and seasoning materials are usually used at meals, therefore, such additional materials will act on masking the sourness remained in the served long-life fresh pasta products. Accordingly, if ash content of the flour is adjusted to about 0.45 wt % or less, satisfactory long-life fresh pasta products will be provided.

Example 3

Long-life fresh pasta products produced from wheat flour (ash content, 0.45 wt % or less) disclosed in Example 2 were sourless and were ideal long-life fresh pasta products. But when the texture of the present long-life fresh pasta products were compared to that of the common dried spaghetti produced from durum semolina, it seemed that further improvement on the texture of the present long-life fresh pasta products are necessary. Therefore, incorporation of alginate-materials into raw flours were tried.

Namely, long-life fresh pasta products were prepared according to the producing method of Example 2 by employing raw materials including wheat flour (ash content, 0.39 wt %; protein content, 11.1 wt %) disclosed in Example 2 and 5.0 g of sodium alginates. Then, texture of the long-life fresh pasta products so produced were examined according to the method of Example 2. Dough pH at just prepared from the raw materials was 7.6, then the lactic acid concentration for acidifying the pasta threads was 1.5%(w/v), and the pH of the acidified threads was 4.3.

As a result, when 5.0 g of sodium alginate was employed, physical characteristics on the common dry pasta products, namely, reasonable texture and firmness was confirmed.

Further, although "degradation" was occurred in the pasta threads prepared without alginic acid, little degradation was confirmed in the present pasta threads containing alginic acid.

Example 4

Fat(s) and/or oil(s) to be incorporated in the raw flours were studied according to the following procedures to improve flavor and palatability (firmness) of the present long-life fresh pasta products.

900 g of wheat flour (ash content, 0.42 wt %; protein content, 12.2 wt %) and 100 g of starch-ester were mixed and kneaded with 320 ml of warm water in which 5 g of alginic acid, 4 g of polymerized phosphate and 5 g of table salts were dissolved. Predetermined amount of fat(s) and/or oil(s) listed in the following Table 3 was further added thereto. Pasta threads were then produced by extruding the mixture (dough) so obtained with an extruder (Automatic Short Pasta Press PA-1 (PAVAN)). Deaerotion condition in the extruder were 60 mmHg of absolute pressure, 80 kg/cm$^2$ of compression force and 1.7 mm diameter of the openings.

Pasta threads (pH 7.6) so produced were weighed (about 125 g) and were boiled with hot water for 10 seconds. After cooling the boiled threads with hot water, threads pH were adjusted to 4.4 by immersing the threads for 45 seconds in 1.5% lactic acid solution. The acidified threads were hermetically packed into pouches, then were pasteurized with steam cooker (Almighty Steam-Pasteurizer (SANKO)) at 95° C. for 40 mitutes, and were cooled. The pasta threads taken out from the pouches were served by leaving them in hot water for one minute and discarding the hot water. Skilled inspectors (five persons) examined the served pasta threads according to the procedures referred to in the Example 2 on flavor, palatability, sourness and sour-odor remained in the served pasta threads.

TABLE 3

| Fat(s) and/or Oil(s) | Amount (g) | Flavor/Palatability | Sourness/ Sour-Odor |
| --- | --- | --- | --- |
| None | 0 | Luck of Smoothness Luckess of Flavor | Little |
| Rapeseed Oil | 5 | No improvement | Little |
| Butter | 30 | Good, But Slightly Oily | None |
|  | 20 | Good | None |
|  | 10 | Good | None |
| Butter Oil | 10 | Good | None |
|  | 5 | Good | None |
|  | 2 | Good | Little |
|  | 1 | Very Good | Little |
| Margarine | 5 | Excellent | None |
| Shortening | 5 | Excellent | None |

Apparently from the results shown in Table 3 above, by incorporating about 1 g or more, preferably, 2 g or more of fat(s) and/or oil(s) (e.g., butter oil) into 1 kg of raw materials, pasta flavor and palatability were improved. But, texture of the pasta threads produced with about 30 g of butter was not so good.

Further, sourness and sour-odor on the present pasta products were effectively reduced in comparison with the pasta produced without any fat or oil. By employing 2 g or more of fat(s) and/or oil(s), most of the sourness and sour-odor were removed. Such effects would not be realized by the other fat(s) and/or oil(s) (e.g., rapeseed oils).

Example 5

900 g of wheat flour (ash content, 0.38 wt %; protein content, 11.0 wt %) and 100 g of acetylated starch were mixed and kneaded with 320 ml of warm water in which 4 g of alginic acid, 4 g of polymerized phosphate and 2.8 g of shortening were dissolved. Pasta threads were then produced by extruding the mixture (dough) so obtained with an extruder (Automatic Short Pasta Press PA-1 (PAVAN)). Deaerotion condition in the extruder were 60 mmHg of absolute pressure, 80 kg/cm$^2$ of compression force and 1.8 mm diameter of the openings.

Pasta threads (pH 7.6) so produced were weighed (about 120 g) and were boiled with hot water for 20 seconds. After cooling the boiled threads with water, threads pH were adjusted to 4.4 by immersing the threads for 45 seconds in 1.5% lactic acid solution. The acidified threads were hermetically packed into pouches, then were pasteurized with steam cooker (Almighty Steam-Pasteurizer (SANKO)) at 98° C. for 40 minutes, and were cooled. The pasta threads were taken out from the pouches and put into cup-form vessel. Such pasta were cooked by pouring hot water into the vessel, leaving it for one minute and discarding the hot water. Retort meat sauce was further added thereto. When this pasta was eaten, taste of which was excellent.

INDUSTRIAL APPLICABILITY

According to the present invention, sourness remained in the common long-life fresh pasta can effectively be reduced. Amount of the acid(s) used for acidifying the noodle threads would also be reduced.

Then, the additives comprising alkaline agents and alginate-materials may realize novel pasta threads having ideal pasta texture including less stickness between the threads and loss of dry materials during boiling of the threads. Such effects by the alginate materials can be derived by once adjusting dough pH to neutral or alkaline zone with alikaline agents and acidifying the pasta threads with acid(s) solution. These unpredictable effects would not be obtained by simply adding alginic acids to the common pasta products.

Further, in accordance with the other preferable embodiment of the present invention, raw materials comprising at least one fat(s) and/or oil(s) (e.g., butter, butter oil, margarine or shortening) would enhance charasteric taste and flavor of the common pasta products, and effectively reduce sourness and sour-odor remained in the long-life fresh pasta products produced accoding to conventional methods.

What is claimed is:

1. A method for producing fresh pasta products having reduced sourness comprising steps of:

(i) preparing dough by mixing raw materials, including raw flour with water;

(ii) preparing pasta threads by extruding the dough;

(iii) gelatinizing the pasta threads by steaming and/or boiling the-pasta threads;

(iv) acidifying the gelatinized pasta threads with acid(s) solution; and (v) packing hermetically the acidified pasta threads into food-containers and pasteurizing them;

wherein the raw flour in the raw materials are those selected to have an ash content of 0.45 wt % or less.

2. The method according to claim 1, wherein said steps (iii) and (iv) are performed concurrently by immersing the pasta threads in the acid(s) solution.

3. The method according to claim 1, wherein said ash content is 0.40 wt % or less.

4. The method according to claim 1, wherein said raw material comprise alkaline agents and at least one alginate material(s) selected from the group consisting of alginic acid, alginic acid salts and alginic acid ester.

5. The method according to claim 4, wherein amount of said alginate material(s) is from 0.1 wt % to 2 wt % of the raw flour, and that of said alkaline agents is the amount necessary to adjust pH of said dough to from 7 to 9.

6. The method according to claim 1, wherein said raw materials further comprise at least one fat(s) and/or oil(s) selected from the group consisting of butter, butter oil, margarine and shortening.

7. The method according to claim 6, wherein amount of said fat(s) and/or oil(s) is from 1 g to 20 g per 1 kg raw flour.

8. The method according to claim 1, wherein said raw materials are substantially free from durum semolina.

9. The method according to claim 2, wherein said ash content of the raw flours in the raw materials is 0.40 wt % or less.

\* \* \* \* \*

UNITED STATES PATENT AND TRADEMARK OFFICE
CERTIFICATE OF CORRECTION

PATENT NO.   : 6,596,331 B1
DATED        : July 22, 2003
INVENTOR(S)  : Yoshio Nobuyasu et al.

It is certified that error appears in the above-identified patent and that said Letters Patent is hereby corrected as shown below:

<u>Title page,</u>
Item [57], ABSTRACT,
Line 5, delete "sting", and insert -- steaming --.
Line 6, delete "the pasta", and insert -- the pasta threads; --.
Line 10, delete "pasteurizing there", and insert -- pasteurizing them --.

<u>Column 8,</u>
Line 43, delete "material comprise", and insert -- materials comprise --.

Signed and Sealed this

Thirteenth Day of April, 2004

JON W. DUDAS
*Acting Director of the United States Patent and Trademark Office*